United States Patent [19]

Ellingsen

[11] Patent Number: 4,941,671
[45] Date of Patent: Jul. 17, 1990

[54] FOUR-WHEEL STEERABLE VEHICLE HAVING A FORE/AFT SLIDING LINK

[75] Inventor: Svein Ellingsen, Bothell, Wash.

[73] Assignee: Paccar Inc., Bellevue, Wash.

[21] Appl. No.: 331,459

[22] Filed: Mar. 31, 1989

[51] Int. Cl.$^5$ ............................................. B62D 61/10
[52] U.S. Cl. ........................................ 280/91; 140/24.01
[58] Field of Search ................. 180/24, 24.01, 22, 23, 180/6.48; 280/81.5, 91

[56] References Cited

U.S. PATENT DOCUMENTS

| | | | |
|---|---|---|---|
| 1,811,798 | 6/1931 | Lucke | 280/91 |
| 2,029,540 | 2/1936 | Porteous | 280/91 |
| 3,586,119 | 6/1971 | Fullerton | 280/91 |
| 3,613,816 | 10/1971 | Gutbrod | 280/91 |
| 4,163,566 | 8/1979 | Tapp | 280/91 |
| 4,295,657 | 10/1981 | Sano et al. | 280/91 |

*Primary Examiner*—Richard A. Bertsch
*Attorney, Agent, or Firm*—Seed and Berry

[57] ABSTRACT

A vehicle having four-wheel steering is disclosed. The rotation of the steering wheel is transferred through a steering gear to a double pitman arm. A drag link is coupled to one end of the double pitman arm and to the front-wheel steering control arm. A second drag link is pivotally coupled to the other end of the double pitman arm and to a sliding link. The sliding link extends from a position adjacent the steering gear to a position adjacent the rear axle. A drag link is pivotally coupled from the other end of the sliding link to an idler arm. The idler arm is pivotally coupled to the frame of the vehicle. Another drag link is pivotally coupled to the idler arm and also to the rear-wheel steering control arm. Rotation of the steering gear causes the double pitman arm to pivot about a central pivot point. As the double pitman arm pivots, the sliding rod moves axially fore or aft, causing the idler arm adjacent the rear axle to pivot. As the idler arm pivots, the steering control arm for the rear wheels moves, causing the wheels to turn an amount proportional to the motion of the idler arm. The support clamp for the sliding link permits fore/aft axial motion of the sliding link but prohibits radial motion of the sliding link. The length of the dray links is variable to permit precise alignment of the wheels of the front axles with the wheels of the rear axle.

22 Claims, 4 Drawing Sheets

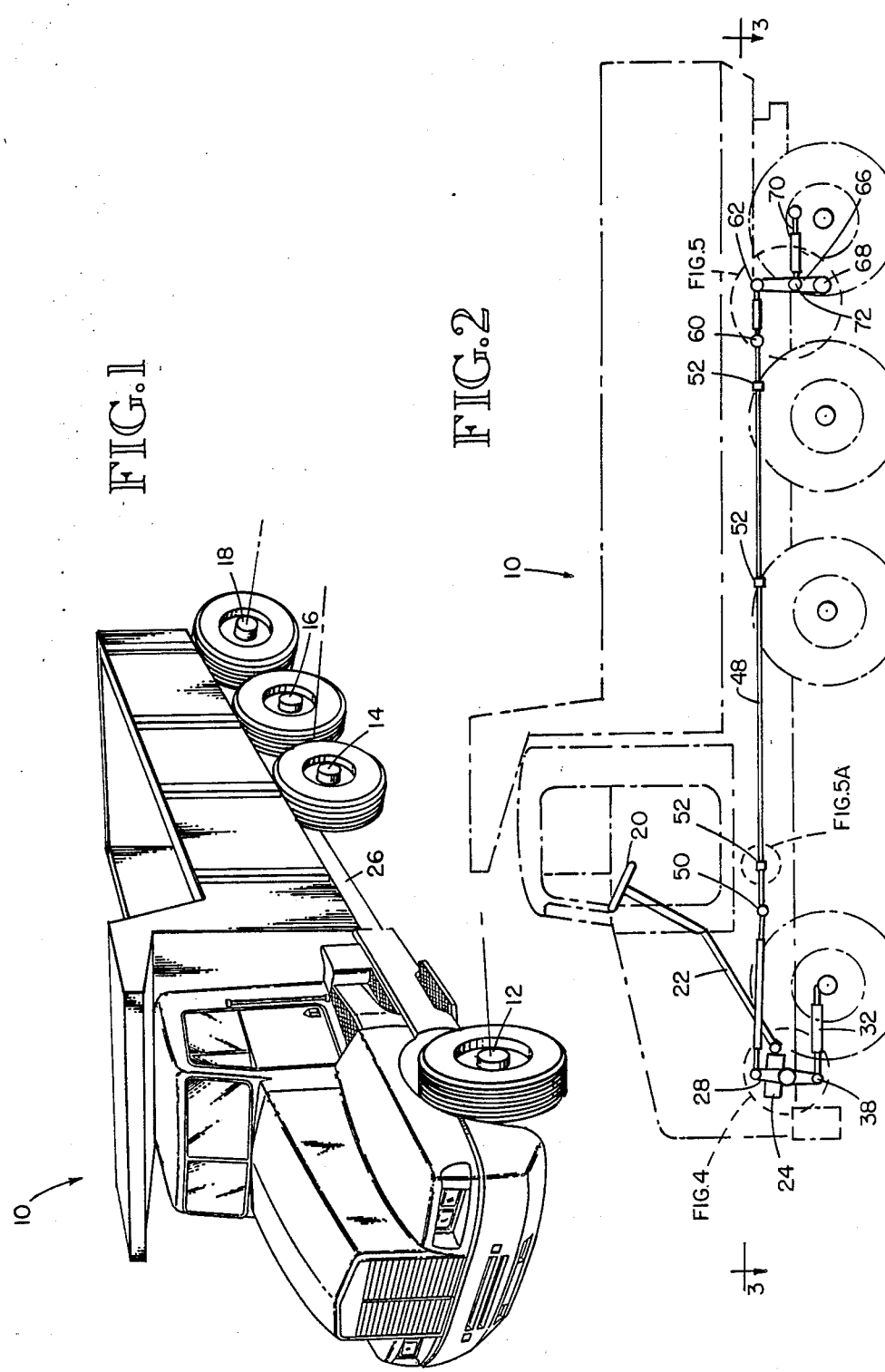

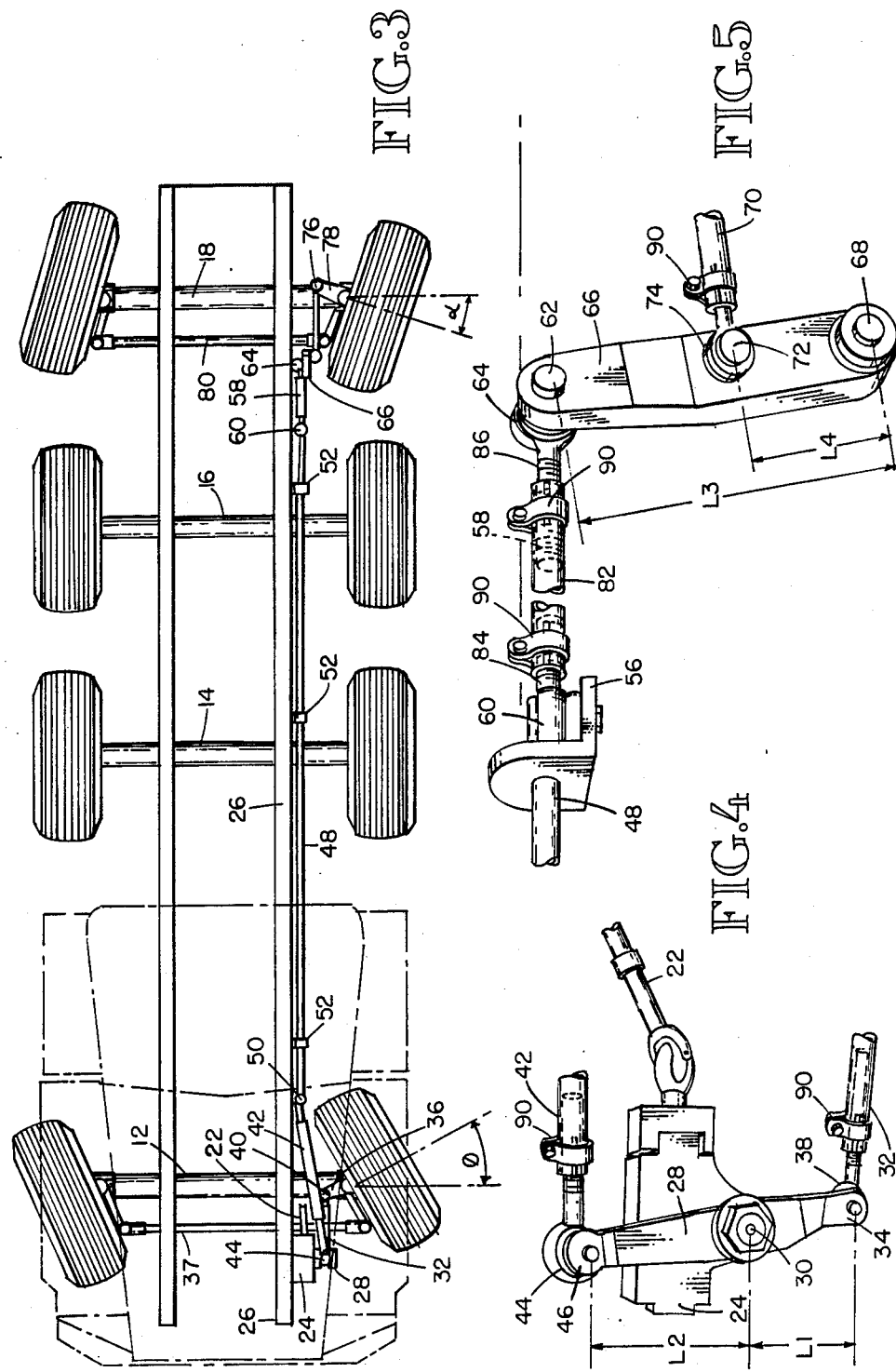

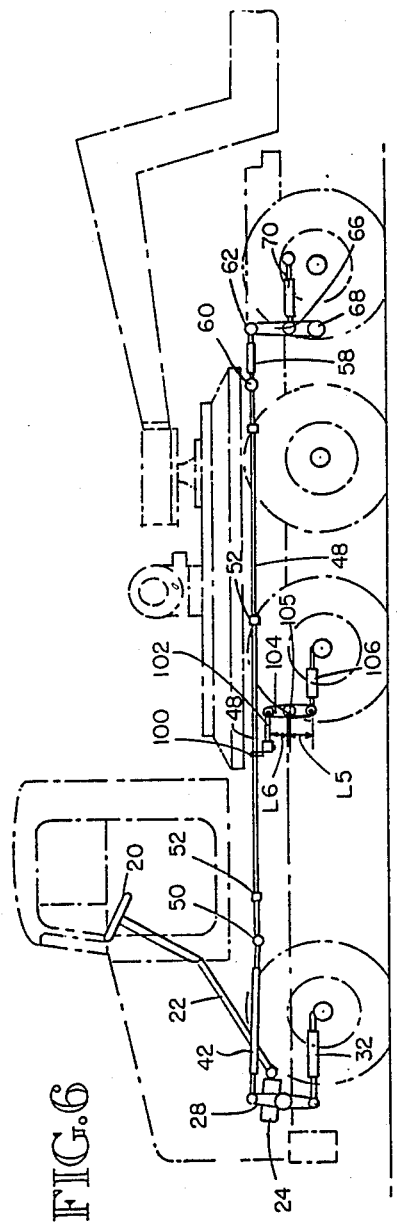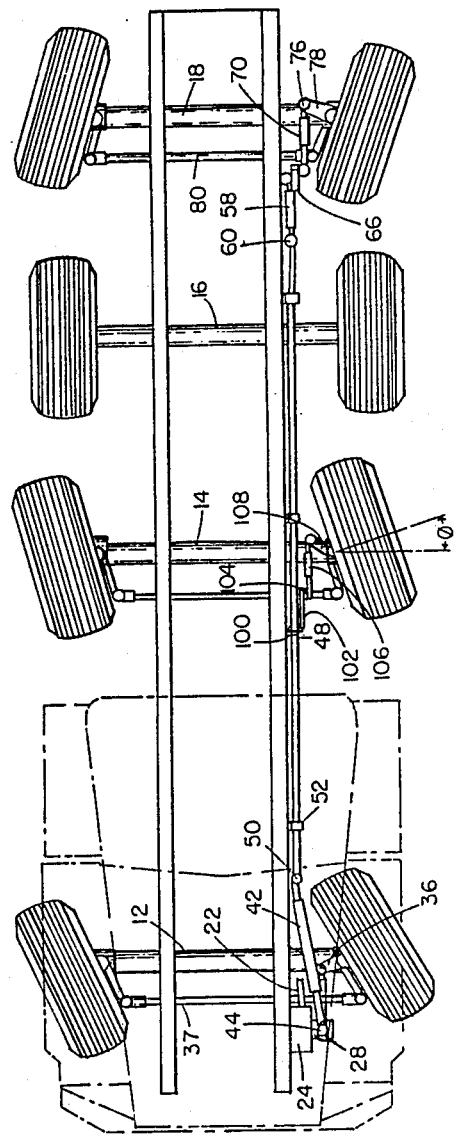

FOUR-WHEEL STEERABLE VEHICLE HAVING A FORE/AFT SLIDING LINK

DESCRIPTION

1. Technical Field

This invention relates to vehicles having four steerable wheels, and more particularly, to a linkage for transferring the rotation of the steering wheel to turn the wheels coupled to a front axle and the wheels coupled to a rear axle.

2. Background of the Invention

Most vehicles in use today are steerable only by turning the wheels coupled to the front axle. A disadvantage of having only front-wheel steering is that the tightness of a turn which the vehicle can make is quite limited. A further disadvantage is that the rear wheels of the vehicle do not follow in the track of the front wheels through a turn. Because the distance between the rear axle and the front axle in a truck is significantly greater than in a car, the problems created by steering by turning only the wheels on the front axle are significantly amplified in a truck. Using only front-wheel steering, a large truck must swing wide to make a turn. In addition, if the streets are relatively narrow, such as streets between houses or on a canyon road, the truck may not be able to stay on the road during a turn.

Various systems have been proposed for steering a large truck by turning wheels on more than one axle. U.S. Pat. No. 1,387,392, to Hallam, suggests a gear linkage system with a plurality of rods extending from the steering wheel to the respective axles. The system of Hallam has the disadvantage of requiring a large number of rods for transferring the rotation of the steering wheel to provide turning of the wheels coupled to respective axles. A further disadvantage of the device of Hallam is that the linking rods require excessive space as the vehicle is driven because the frame moves with respect to the steering linkage.

SUMMARY OF THE INVENTION

It is therefore an object of this invention to provide an apparatus which transfers the rotation of the steering wheel from the steering gear to the rear axle with fore-/aft axial motion of a sliding link.

It is another object of this invention to permit the angle of the turn of each wheel to be easily adjustable based on the position of the mechanical linkage in a pivoting arm.

It is another object of this invention to use a single sliding link for transferring the rotation of the steering wheel to turn the wheels coupled to two or more axles.

These and other objects of the invention are accomplished by providing a steering gear having a double pitman arm which pivots as the steering wheel is rotated. A first drag link is pivotally coupled between one end of the double pitman arm and a front-wheel steering control arm. A second drag link is pivotally coupled between the other end of the double pitman arm and a sliding link. The sliding link extends from a region adjacent the front axle to a region adjacent the rear axle. A third drag link is pivotally coupled between the sliding link and one end of an idler arm. The idler arm is pivotally coupled to the frame of the vehicle. A fourth drag link is pivotally coupled to the idler arm and a rear-wheel steering control arm. The pivotal coupling at each end of the drag links permits horizontal and vertical pivoting simultaneously. The sliding link is supported by support clamps having bushings therein which permit fore/aft axial motion but restrain radial motion of the sliding link. The rotation of the steering wheel is transferred to the rear axle through the fore/aft axial motion of the sliding link.

The degree of turn through which the wheels turn for a given rotation of the steering wheel is based on the distance from the position of the drag link attachment to the pivot point for the respective pivoting arms. By positioning the drag link for the rear wheels closer to the pivot point of the idler arm than the drag link for the front wheels is to the pivot point of the double pitman arm, the degree of turn of the rear wheels is selected to be less than the degree of turn for the front wheels for a given turning radius. Controlled turning of wheels attached to other axles is provided by coupling an idler arm or double pitman arm to the frame and respective drag links between the sliding link and a control arm for the wheels of the other axle.

BRIEF DESCRIPTION OF THE DRAWINGS

FIG. 1 is an isometric view of a truck having controlled turning of wheels coupled to the front axle and rear axle.

FIG. 2 is a side elevational view of the truck of FIG. 1, with the truck shown in phantom lines.

FIG. 3 is a top plan view of the steering control linkage for the truck of FIG. 1.

FIG. 4 is an enlarged view of the front wheels' steering control linkage of the region as shown in FIG. 2.

FIG. 5 is an enlarged view of the rear wheels' steering control linkage of the region as shown in FIG. 2.

FIG. 6 is a side elevational view of a truck having controlled turning of two rear axles from a single sliding link, with the truck shown in phantom.

FIG. 7 is a top plan view of the truck of FIG. 6.

DETAILED DESCRIPTION OF THE INVENTION

Figure 5A:
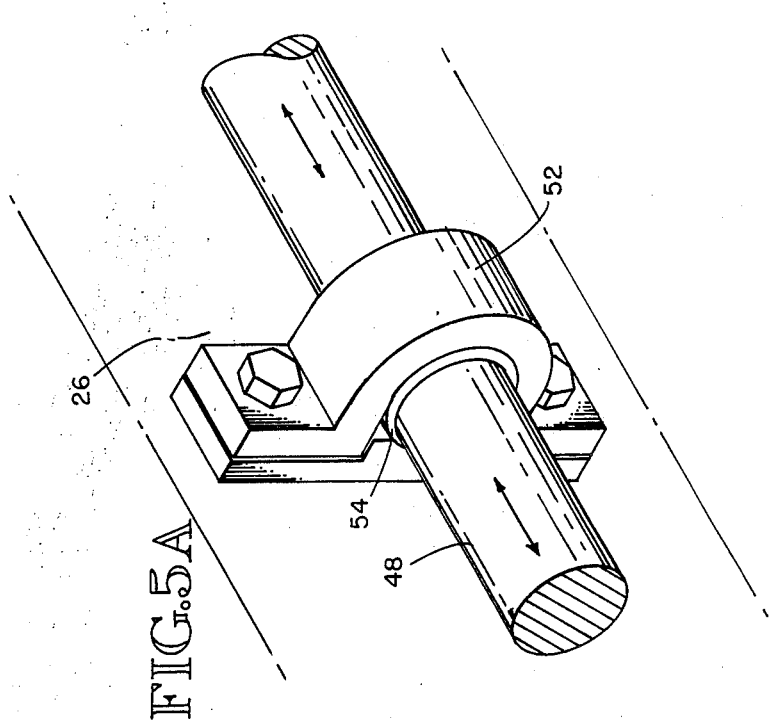
FIG. 5A is an isometric view of the support clamp for the sliding link taken from FIG. 2.

A truck 10 having a front axle 12 and rear axles 14, 16 and 18 is illustrated in FIGS. 1–3. The truck 10 includes a steering wheel 20 and a steering shaft 22. The steering shaft 22 is coupled to steering gear 24. The steering gear 24 and steering shaft 22 are supported by the frame 26 of the truck 10. Rotation of the steering wheel 20 causes the shaft 22 to rotate and the gears within the steering gear 24 to rotate, as is known in the art.

As shown in FIG. 4, a double pitman arm 28 is coupled for pivoting about a pivot point 30 of a gear in the steering gear 24. The pivot point 30 is at a central region of the double pitman arm 28. Rotation of the steering gear 24 causes the double pitman arm 28 to pivot about pivot point 30 in the direction corresponding to the direction of rotation of steering wheel 20. A drag link 42 is pivotally coupled with ball joint coupling 44 to a second end 46 of the double pitman arm 28, as best shown in FIG. 4. A drag link 32 is pivotally coupled with a ball joint coupling to a first end 34 of the double pitman arm 28. The drag link 32 is also pivotally coupled with a ball joint coupling to a front-wheel steering control arm 36 for causing the front wheels to turn as the steering control arm 36 moves, as best shown in FIG. 3. A track rod 37 extends from the steering control arm 36 to the other front wheel of the axle 12 for providing turning of both wheels from the steering control arm, in a manner known in the art. For example, a rigid tie rod 37 may be used; further, a hydraulic boost may be provided to aid in turning the wheels, as is known in the art.

The length of the fore/aft movement of the drag link 32 for a given rotation by the double pitman arm 28 is determined by the distance of the coupling point 38 from the pivot point 30, shown as L1 in FIG. 4. The longer the distance L1, the greater the linear movement of the drag rod 32 for a given angle of rotation of the double pitman arm 28. Similarly, the linear movement of the drag link 42 is based on the distance from the coupling of the ball joint 44 to the pivot point 30, L2, as shown in FIG. 4. In the preferred embodiment, L2 is greater than L1, causing drag link 42 to undergo a greater fore/aft displacement than drag link 32 for the same amount of rotation of double pitman arm 28. However, L2 and L1 may be equal or L1 may be greater than L2, if desired, so long as the other linkage lengths are proper to ensure the correct turning angles of the wheels on each axle are provided.

A sliding link 48 is pivotally coupled with a ball joint coupling 50 to the other end of drag link 42. The sliding link 48 extends from a region adjacent the front axle 12 to a region adjacent the rear axle 18, as best shown in FIG. 3. Sliding link 48 is coupled to the frame 26 with support clamps 52. As shown in FIG. 5A, support clamp 52 substantially surrounds the sliding link 48. Radial motion of the sliding link 48 is thus prevented by the support clamp 52. Fore/aft axial motion of the sliding link 48 is permitted by the support clamp 52. The support clamp 52 includes self-lubricating bushings 54, a sliding sleeve, or other member to permit sliding link 48 to easily undergo fore/aft axial motion.

An L-bracket 56 is coupled to both ends of the sliding link 48, one end of which is shown in FIG. 5. A drag link 58 is pivotally coupled with a ball joint coupling 60 at the end of the sliding link 48 adjacent the rear axle 18. The L-bracket 56, coupled to the sliding link 48, provides the proper fixture for a ball joint coupling between the drag link 58 and the sliding link 48. Another L-bracket (not shown) facilitates coupling of the drag link 42 to the other end of the sliding link 48.

An idler arm 66 is pivotally coupled at point 68 to the frame 26. The other end 62 of the drag link 58 is coupled with a ball joint coupling 64 to the idler arm 66. A fourth drag link 70 is pivotally coupled with a ball joint coupling 74 to the idler arm 66 to pivot about point 72. The drag link 70 is pivotally coupled with ball joint coupling 76 to rear-wheel steering control arm 78 for causing the rear wheels to turn as the steering control arm 78 moves. A track rod 80 extends from the steering control arm 78 to the other wheel, as is known in the art and described with respect to rod 37.

As shown in FIG. 5, the distance L4 from the pivot point 68 of the idler arm 66 to the pivot point 72 of the drag link 70 determines the distance that the drag link 70 moves for a given rotation of the idler arm 66. Similarly, the distance L3 of the pivot point 62 of the drag link 58 from the pivot point 68 of the idler arm 66 determines the rotation of the idler arm for a given linear motion of the drag link 58. For a greater L3, the angular rotation becomes greater. The distances L3 and L4 are selected to provide a desired amount of turning of the rear wheels coupled to axle 18 for a given rotation of the steering wheel 20, based on given distances L1 and L2.

Each of the drag links 32, 42, 58 and 70 are coupled at both ends to the respective other members with ball joint couplings. Each of the ball joint couplings permits pivotal motion of the drag links with respect to the member to which they are attached in horizontal and vertical planes simultaneously. Using ball joint couplings at each end of the drag links provides the advantage that the vertical and horizontal displacements of the wheels and suspension system received from the road are not transferred to the sliding link 48. The sliding link 48 undergoes only simple fore/aft axial motion.

Drag link 58 is illustrative of the construction of the other drag links. The drag link 58 includes a sleeve 82 threaded at both ends. Rigid shafts 84 and 86 having mating threads at the respective ends thereof are threaded into the sleeve 82 to form the drag link 58. The threads at the ends of the rigid rods 84 and 86 are in opposite directions, one being a left-hand thread and the other being a right-hand thread. Rotation of the sleeve 82 in a first angular direction cases the rods 84 and 86 to be drawn together, shortening the length of drag link 58. Rotating the sleeve 82 in the opposite direction threads the links 84 and 86 out of the sleeve 82, causing the drag link 58 to lengthen. Each of the drag links is constructed in a similar manner to drag link 58, having respective threaded rigid rods and a sleeve so that rotation of the sleeve is effective to lengthen or shorten the overall length of the drag link.

The exact length of the drag links with respect to each other is precisely determined to ensure straight tracking when the truck is not turning and accurate and precise turning. When the truck is driving straight (with no turns), the lengths of respective drag links 32 and 70 or, if necessary, also drag links 42 and 58, are adjusted to ensure that the front wheels and rear wheels both run in the identical, straight track. A clamp 90 is provided at the ends of the respective sleeves for clamping the threads solidly in position with respect to each other once the proper alignment and precise adjustment have been made.

The operation of the invention is as follows: Rotation of the steering wheel 20 by the operator causes the steering shaft 22 and hence the steering gear 24 to rotate. Rotation of the steering gear 24 causes the double pitman arm 28 to pivot about point 30. Pivoting of the double pitman arm 28 about point 30 causes the drag links 32 and 42 to move in opposite directions. Drag link 32 is coupled to the front-wheel steering control arm 36, which moves fore or aft, thus turning the wheels coupled to the front axle 12 by an angle $\theta$.

The amount of rotation of the steering wheel 20 required to achieve a desired angle $\theta$ is determined by the ratio of the steering gear 24 and the length L1 from the pivot point 30 to the pivot point 38 of the drag link 32. If the distances L1 and L2 are equal to each other, the length of travel of the drag links 32 and 42 will be equal; however, if the distance L2 is longer or shorter than the distance L1, the length of travel of the drag link 42 will correspondingly be longer or shorter.

The linear motion of drag link 42 is transferred to sliding link 48 as pure fore/aft axial motion of the sliding link, and hence to drag link 58. The motion of the drag link 58 causes the idler arm 68 to undergo pivoting motion about point 68. Pivoting of the idler arm 66 about point 68 causes the drag link 70 and the rear-wheel steering control arm 78 coupled thereto to undergo linear motion. Movement of the steering control rod 78 causes the wheels coupled to the rear axle 18 to turn by an angle α.

The amount of turn θ of a wheel coupled to the front axle 12 is generally different from the amount of turn α for a wheel coupled to the rear axle 18. As is well known in the art, the amount of turn of the rear wheels must be less than the amount of turn of the front wheels to provide a smooth turn because the rear axle is closer to the turning center of the truck 10. The distances L1, L2, L3 and L4 are selected to provide the required angles θ and α for a given rotation of the steering wheel 20. The distances are selected to ensure that the front wheels and rear wheels turn precisely the desired amount for a smooth turn, without skidding. Factors such as the overall distance between the front and rear axles, the number of rear axles, the desired point of turning center of the vehicle, and other factors are used to determine the distances, as is now done in the art for other four-wheel steering systems.

For example, L2 may be smaller than L1, and L3 may be approximately equal to L4, in which event L4 may be greater than L1 and still provide a turning angle α which is less than a turning angle θ. In an alternative embodiment, the arm 28 extending from the steering gear 24 is an idler arm located between the front and rear axles, with a drag link extending in each direction, rather than a double pitman arm, and the arm 66 is a double pitman arm, thus providing the requirement that the rear wheels turn a different direction than the front wheels.

Providing a ball joint coupling at each end of the drag links permits sliding link 48 to transfer the motion in a fore/aft axial motion without radial displacement. Because the wheels are coupled through a suspension system to the frame, the wheels coupled to each axle will undergo significant horizontal and vertical displacements relative to the frame 26. Because the coupling at each end of the drag links permits simultaneous pivoting about horizontal and vertical planes, the motion of the wheels and suspension system with respect to the frame is not transferred to the sliding link 48. Further, because the drag links 42 and 58 are pivotally coupled with ball joints at each end, the double pitman arm 28 and idler arms 66 may undergo some vertical displacement during their fore/aft travel but not transmit the vertical displacement to the sliding link 48. Transfer of the movement of the steering wheel 20 from a region adjacent the steering gear 24 to a region adjacent the rear axle 18 is significantly simplified and more compact because the sliding link 48 undergoes only fore/aft axial motion.

FIGS. 6 and 7 illustrate an alternative embodiment in which wheels coupled to more than one rear axle are turned through rotation of steering wheel 20. An L-bracket 100 similar to the L-bracket 56 is couple to the sliding link 48. The sliding link 48 continues beyond L-bracket 100, either as a continuous single rod extending through L-bracket 100 or as a rigid rod threaded at both ends into L-bracket 100. Drag link 102 is pivotally coupled to the L-bracket 100. The drag link 102 is coupled to one end of a double pitman arm 104. The double pitman arm 104 is pivotally coupled at a point 105 in a central region to the frame 26. A drag link 106 is pivotally coupled to the other end of double pitman arm 104 and to a rear-wheel steering control arm 108. The steering linkage for the wheels coupled to front axle 12 and rear axle 18 is similar to that shown and described with respect to FIGS. 1–5A, and need not be repeated here.

The distance L5 from the pivot point 105 of the double pitman arm 104 to the attachment point of the drag link 106 determines the length of displacement of the drag link 106 for a given rotation of the double pitman arm, as previously described with respect to double pitman arm 28. Because the axle 14 is positioned forward of the pivoting point of the vehicle 10, the wheels coupled to the axle 14 turn in the same direction as the wheels coupled to the front axle 12. Coupling the sliding link 48 to the steering control arm 108 through a double pitman arm 104 causes the wheels to turn in the opposite direction from the movement of the sliding link 48 and in the same direction as the wheels coupled to the front axle 12.

Because the axle 14 is closer to the turning center of the vehicle 10 than the axle 12, the turn ∅ of the wheels on axle 14 is less than the turn θ of the wheels on axle 12. The distances L5 and L6 are selected to provide the required turn angle ∅ based on the distance of the axle 14 from the turning center. Generally, both L5 and L6 are less than L1. The construction and operation of the turning linkage for the wheels of axle 14 are similar to the construction and operation for the turning linkage of wheels coupled to axle 12 and need not be repeated in detail.

The wheels, coupled to any desired number of axles, be it two, three, four, five or more, can appropriately be turned the required amount to provide a smooth and tight turn using a single sliding link 48. If the axle 14 is positioned aft of the center of turning of the vehicle 10, an idler arm similar to the idler arm 66 is used to couple the linear movement of the sliding link 48 to cause turning of the wheels coupled to the axle 14 in the same direction as the wheels coupled to rear axle 18, albeit the angle of the turn is less.

A coupling can be made at any position along sliding link 48 to transfer the motion of steering wheel 20 to the wheels of a selected axle. The steering movement for all wheels to all axles behind the front axle can be transferred by a single sliding link 48, rather than requiring multiple coupling links. To connect the sliding link 48, the appropriate bracket is coupled to the sliding link 48 at a desired position coupling to the steering control arm of the selected axle through the appropriate pivoting arm. Either a double pitman arm or an idler arm, having drag links coupled thereto, provides turning of the wheels coupled to the respective axle, as previously shown and described herein.

The invention has been shown used on a dump truck having four axles in one embodiment and on a tractor having a trailer coupled thereto, the tractor having four axles, as shown in FIG. 6. Alternatively, any type of vehicle having two or more axles, whether a fire engine, tractor, long truck with attached trailer, or other vehicle may have steering provided for wheels coupled to an axle other than the front axle using the methods and structure described herein.

I claim:

1. An apparatus providing controlled steering of four wheels on a vehicle, two of said wheels being front axle wheels coupled to a front axle and two of said wheels being rear axle wheels coupled to a rear axle, comprising:

a steering shaft rotatably coupled to a frame of said vehicle, said steering shaft having a steering wheel means coupled thereto for rotation by a driver to steer said vehicle;

a steering gear coupled to said steering shaft and to said frame of said vehicle;

an arm coupled to said steering gear, said arm pivoting about a point when said steering shaft rotates;

a first drag link having a first end pivotally coupled to said arm and a second end pivotally coupled to a front-wheel steering control arm, said front-wheel steering control arm coupled to said front axle wheels;

a second drag link having a first end pivotally coupled to said arm;

a sliding link extending from a position adjacent said front axle to a position adjacent said rear axle, said second drag link being pivotally coupled to said sliding link;

a third drag link having a first end pivotally coupled to a second end of said sliding link and a second end pivotally coupled to an idler arm, said idler arm being coupled at an idler arm pivot point to said frame at a position adjacent said rear axle; and a fourth drag link having a first end pivotally coupled to said idler arm and a second end pivotally coupled to a rear-wheel steering control arm, said rear-wheel steering control arm coupled to said rear axle wheels.

2. The apparatus according to claim wherein said arm is a double pitman arm.

3. The apparatus according to claim 2 wherein said pivot point of said arm is at a central region in said double pitman arm and said first drag link is coupled adjacent a first end of said arm and said second drag link is coupled adjacent a second end of said arm for moving in opposite directions fore and aft when said double pitman arm pivots, said first drag link being positioned closer to said pivot point than said second drag link is to said pivot point.

4. The apparatus according to claim 1 further including support means for supporting said sliding link permitting fore/aft axial movement of said sliding link but restraining radial movement of said sliding link.

5. The apparatus according to claim 1 wherein said idler arm pivot point is adjacent a first end of said idler arm, and said third drag link is coupled to said idler arm adjacent a second end of said idler arm, and said fourth drag link is coupled to said idler arm closer to said idler arm pivot point than said third drag link is coupled to said idler arm pivot point.

6. The apparatus according to claim 1 wherein said pivotal couplings of each of said drag links are ball joint couplings permitting pivotal movement in both vertical and horizontal planes simultaneously.

7. The apparatus according to claim 1 further including a second rear axle positioned between said rear axle and said front axle and having two wheels coupled to said second rear axle;

a second arm pivotally coupled to said frame adjacent said second rear axle;

a fifth drag link having a first end pivotally coupled to said sliding link and a second end pivotally coupled to said second arm; and a sixth drag link having a first end pivotally coupled to said second arm and a second end pivotally coupled to a second rear-wheel steering control arm, said second rear-wheel steering control arm being coupled to said wheels coupled to said second rear axle.

8. The apparatus according to claim 7 wherein said second arm is a second double pitman arm.

9. The apparatus according to claim 8 wherein the distance between said second double pitman arm pivot point and the point of coupling of said sixth drag link to said second double pitman arm is less than the distance between said first double pitman arm pivot point and the point of coupling of said first drag link to said first double pitman arm.

10. An apparatus for providing controlled steering of four wheels on a vehicle, two of said wheels being front axle wheels coupled to a front axle and two of said wheels being rear axle wheels coupled to a rear axle, said rear axle being aft of said front axle, comprising:

a steering wheel means for rotation by a driver;

a steering shaft means coupled to said steering wheel means and to a frame of said vehicle for rotating when said steering shaft rotates;

a steering gear means coupled to said steering shaft and to a frame of said vehicle for rotating when said steering shaft rotates;

a double pitman arm means coupled to said steering gear means at a central region of said double pitman arm means for pivoting about a pivot point in said central region when said steering wheel means rotates, said double pitman arm having a first end and a second end spaced from said central region;

a first drag link means pivotally coupled at one end thereof to said first end of said double pitman arm for moving fore or aft when said double pitman arm pivots;

a front-wheel steering control arm means coupled to wheels on said front axle, said first drag link means being pivotally coupled to said front wheel steering control arm for causing said front wheels to turn when said steering control arm means moves;

a second drag link pivotally coupled to said second end of said double pitman arm for moving fore or aft when said double pitman arm pivots;

a sliding link means coupled to said frame and extending from a region adjacent said double pitman arm to a region adjacent said rear axle, said second drag link means being pivotally coupled to said sliding link for causing said sliding link to move fore or aft axially when said double pitman arm pivots;

a third drag link means pivotally coupled to said sliding link for moving when said sliding link moves fore or aft;

an idler arm means pivotally coupled at a first end to said frame and having said third drag link means pivotally coupled at a second end to said idler arm means for causing said idler arm to pivot when said third drag link means moves;

a fourth drag link pivotally coupled to said idler arm at a position between said second end and said first end; and a rear wheel steering control arm means coupled to said wheels on said rear axle, said fourth drag link means being pivotally coupled to said rear wheel steering control arm for causing said rear wheels to turn when said steering control arm means moves.

11. The apparatus according to claim 10 wherein said first drag link means is coupled to said double pitman arm at a position closer to said pivot point than said second drag link means is to said pivot point.

12. The apparatus according to claim 10 wherein the distance from said idler pivot point to the position where said fourth drag link is pivotally coupled to said idler arm is less than the distance from said double pitman arm pivot point to the position where said first drag link is pivotally coupled to said double pitman arm.

13. The apparatus according to claim 10 wherein each of said drag links includes a sleeve and a rod threadably coupled to said sleeve at each end for varying the length of said drag link to control the position of the steering wheel control arm for a given sliding link position to ensure that said front wheels and said rear wheels are both pointing straight forward for a given steering wheel angular position.

14. The apparatus according to claim 10 wherein the pivotal coupling at each end of each of said drag links is a ball joint coupling permitting pivotal movement about horizontal and vertical planes simultaneously.

15. The apparatus according to claim 10, further including a second rear axle positioned between said rear axle and said front axle;
a second double pitman arm pivotally coupled to said frame adjacent said second rear axle means for pivoting about a point in a control region;
a fifth drag link means having a first end pivotally coupled to said sliding link and a second end pivotally coupled to a first end of said second double pitman arm for causing said second double pitman arm to pivot as said sliding link moves fore or aft axially;
a sixth drag link means having a first end pivotally coupled to said second double pitman arm at a second end thereof and a second end pivotally coupled to a second rear-wheel steering control arm for causing two wheels coupled to said second rear axle to turn when said sliding link moves fore or aft.

16. The apparatus according to claim 10, further including bushings rigidly coupled to said frame and surrounding said sliding link for supporting said sliding link from said frame and permitting fore-and-aft axial movement of said sliding link but restraining radial movement of said sliding link.

17. The method of steering wheels of a vehicle coupled to more than one axle, comprising:
rotating a steering wheel;
pivoting a double pitman arm coupled to said steering wheel through a steering linkage, said double pitman arm pivoting about a central region in response to rotation of said steering wheel;
moving a first drag link fore or aft as said double pitman arm rotates, said first drag link being pivotally coupled to said double pitman arm and to a front wheel steering control arm for turning wheels coupled to a front axle;
moving a second drag link fore or aft as said double pitman arm rotates, said second drag link being pivotally coupled to said double pitman arm;
moving a sliding link fore or aft axially as said second drag link moves fore or aft, said sliding link being pivotally coupled to said second drag link and said sliding link extending from a region adjacent said first axle to a region adjacent said second axle;
moving a third drag link fore or aft as said sliding link moves fore or aft, said third drag link being pivotally coupled to said sliding link;
pivoting an idler arm about a pivot point as said third drag link moves fore or aft, said idler arm being pivotally coupled to said frame; and
moving a fourth drag link fore or aft as said idler arm pivots, said fourth drag link being pivotally coupled to said idler arm and to a rear wheel steering control arm for turning wheels coupled to said rear axle as said fourth drag link moves fore or aft.

18. The method according to claim 17, further including the step of restraining radial movement of said sliding link while permitting axial movement of said sliding link.

19. A steering transfer mechanism for a wheeled vehicle having a set of forward steerable wheels and at least one set of rearward steerable wheels, said vehicle having a chassis, the improvement comprising:
first means for steering the forward steerable wheels;
means for transferring steerable movement of the forward steerable wheels to steerable movement of the rearward wheels, said transferring means including an elongated link extending from a region adjacent said forward steerable wheels to a region adjacent said rearward wheels, said link being slidably coupled to the chassis; and
a clamping means for coupling said link to said chassis, said clamping means permitting fore-and-aft axial movement of said link and restraining lateral and vertical movement of said link.

20. The mechanism of claim 19, said transferring means including drag links pivotally coupled to said slidably mounted link whereby the set of rearward steerable wheels is easily coupled to said link at any position along the length thereof.

21. An apparatus for providing controlled steering of wheels coupled to a front axle on a vehicle having a frame, and wheels coupled to a rear axle of said vehicle, comprising:
a steering shaft rotatably coupled to said vehicle, said steering shaft having a steering wheel means coupled thereto for rotation by a driver to steer said vehicle;
a steering gear coupled to said steering shaft;
a front arm coupled to said steering gear, said arm pivoting when said steering shaft rotates to steer said wheels coupled to said front axle;
a sliding link extending from a position adjacent the front axle to a position adjacent the rear axle, said sliding link being coupled to said steering gear and moving fore and aft axially upon rotation of said steering gear;
a clamp coupling said sliding link to said chassis, said clamp generally surrounding said sliding link and permitting fore-and-aft axial movement, but restraining lateral and vertical movement of said link; and
a rear arm coupled to said rear wheels and to said sliding link, said rear arm pivoting when said sliding link moves fore and aft to steer said wheels coupled to said rear axle.

22. The apparatus according to claim 21, further including a coupling arm coupled to said steering gear, and to said sliding link, said coupling arm being pivotally coupled at each end thereof for ensuring that said sliding link undergoes solely fore-and-aft lateral motion as said steering gear rotates.

* * * * *

UNITED STATES PATENT AND TRADEMARK OFFICE
CERTIFICATE OF CORRECTION

PATENT NO. : 4,941,671

DATED : July 17, 1990

INVENTOR(S) : Svein Ellingsen

It is certified that error appears in the above-identified patent and that said Letters Patent is hereby corrected as shown below:

In claim 2, column 7, line 26, after "claim" please insert --1--.

Signed and Sealed this

First Day of October, 1991

Attest:

HARRY F. MANBECK, JR.

Attesting Officer

Commissioner of Patents and Trademarks